United States Patent [19]

Affa

[11] 4,430,799
[45] Feb. 14, 1984

[54] ERROR COMPENSATION SYSTEM

[75] Inventor: Alfred Affa, Stein, Fed. Rep. of Germany

[73] Assignee: Dr. Johannes Heidenhain GmbH, Traunreut, Fed. Rep. of Germany

[21] Appl. No.: 408,863

[22] Filed: Aug. 17, 1982

[30] Foreign Application Priority Data

Sep. 17, 1981 [DE] Fed. Rep. of Germany ....... 3136981

[51] Int. Cl.³ .......................................... G01B 11/04
[52] U.S. Cl. ................................ 33/125 R; 33/125 C
[58] Field of Search ............ 33/125 R, 125 C, 125 A; 356/373, 374; 250/237 G

[56] References Cited

U.S. PATENT DOCUMENTS

| | | |
|---|---|---|
| 226,162 | 4/1980 | Darling . |
| 2,336,550 | 12/1943 | Kruper . |
| 2,995,826 | 8/1961 | Brault . |
| 3,039,032 | 6/1962 | Fowler . |
| 3,182,375 | 5/1965 | Hoffrogge . |
| 3,816,003 | 6/1974 | Litke . |
| 4,047,586 | 9/1977 | Dlugos . |
| 4,170,828 | 10/1979 | Ernst .................................. 33/125 R |
| 4,170,829 | 10/1979 | Nelle .................................. 33/125 R |

FOREIGN PATENT DOCUMENTS

| | | |
|---|---|---|
| 866402 | 2/1953 | Fed. Rep. of Germany . |
| 1070522 | 5/1960 | Fed. Rep. of Germany . |
| 1231595 | 12/1960 | Fed. Rep. of Germany . |
| 2042505 | 8/1970 | Fed. Rep. of Germany . |
| 1303080 | 10/1971 | Fed. Rep. of Germany . |
| 2724858 | 3/1979 | Fed. Rep. of Germany . |
| 47-45024 | 1/1972 | Japan . |
| 266408 | 5/1950 | Switzerland . |
| 455303 | 6/1968 | Switzerland . |

Primary Examiner—Harry N. Haroian
Attorney, Agent, or Firm—Willian, Brinks, Olds, Hofer, Gilson & Lione, Ltd.

[57] ABSTRACT

An error correction system is disclosed which includes an error correction profile element which extends in a measuring direction inside a housing which contains a measuring scale. The disclosed error compensation system is used to compensate for guidance errors of machines or division errors of the measuring scale. The correction profile element is made as a one piece element having regions of reduced cross sectional area. The profile element is mounted to the housing by means of eccentrics which can be used to adapt the contour of the correction profile element to correspond to the error to be compensated. The error correction profile bends at the regions of reduced cross sectional area while retaining a rectilinear profile in the intermediate regions between the regions of reduced cross sectional area such that a smooth transition is provided between the intermediate regions.

5 Claims, 6 Drawing Figures

FIG. 1
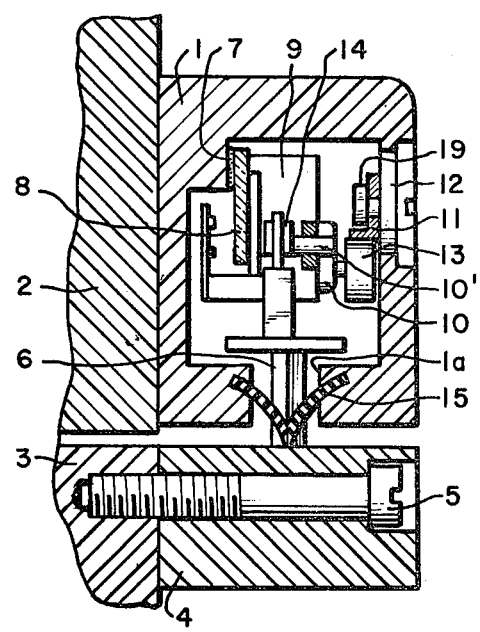
FIG. 2
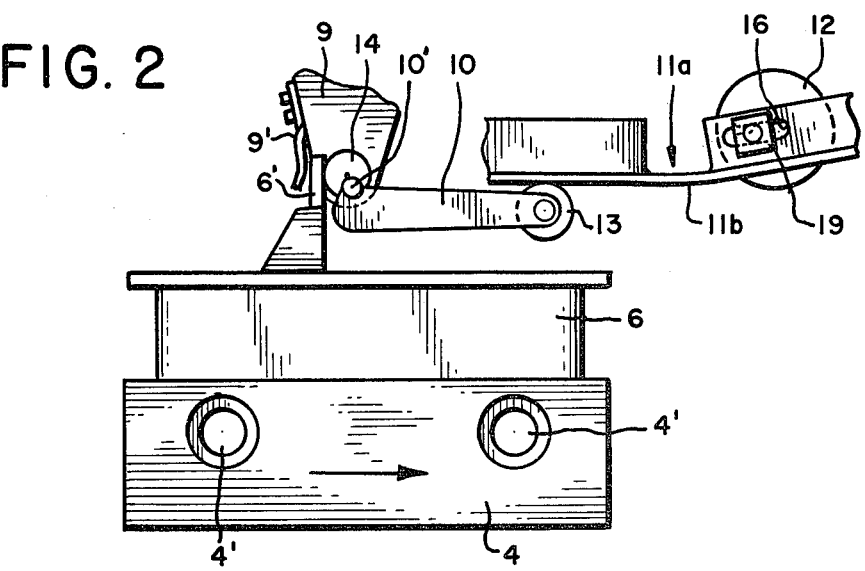
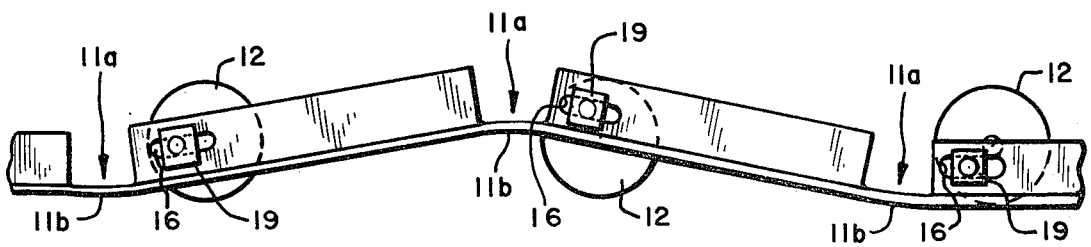
FIG. 3

ERROR COMPENSATION SYSTEM

BACKGROUND OF THE INVENTION

The present invention relates to a system for error compensation in precision machines and measuring instruments, and in particular to a correction system for an encapsulated length measuring instrument of the type used to measure the relative position of two objects, which instrument includes a correction profile which is adjustable transversely to the measuring direction, a scale, and a scanning unit guided to move along the scale. Such instruments can be used to measure the relative positions of the slide piece with respect to the bed of a precision machine, for example.

A number of types of correction compensation systems for correcting measurement errors are known. In German Pat. No. 866 402 there is shown a measuring instrument with a correction straight edge, wherein the reading mark of the instrument is routed mechanically to a position corresponding to the respective error of a spindle opposite the scale. A similar system is shown in U.S. Pat. No. 226,162. U.S. Pat. No. 3,039,032 discloses a position measuring system which utilizes a correction template which is scanned by a sensor that acts directly on the measurement transducer. Swiss Pat. No. 266 408 discloses an optical measuring system in which a correction profile is scanned by a sensor which acts to control means for influencing the beam path of an optical reading unit. German DE AS No. 1 231 595 discloses a system for remotely displaying the movement of a movable machine component, in which a compensation system is provided for correcting measurement errors, which system comprises a deformable metal band which is scanned by a pick-up sensor. Similarly, a deformable metal band is used as a correction profile in the systems disclosed in U.S. Pat. No. 3,182,375 and U.S. Pat. No. 2,336,550. Another error correction system is described in German DE OS No. 2 042 505. There, a correction template is scanned by means of a scanning member to provide an additional movement corresponding to the previously measured error of a machine spindle in a numerical measuring system.

A number of prior art devices have provided means for adjusting correction templates. For example, in German Pat. No. 1 303 080, German Pat. No. 1 070 522, and U.S. Pat. No. 2,995,826, systems are described in which correction templates are mounted so as to be pivotable about a pivot point. By suitably orienting the correction template and then locking it in position, the effective correction profile of the correction template can be adjusted in a direction transversely to the measurement direction.

In addition, German Pat. No. 27 24 858 (which corresponds to U.S. Pat. No. 4,170,828) discloses a correction profile which is made up of a number of individual profile sections which are joined one with another so as to articulate in the manner of a chain. Individual profile sections of this device can be adjusted transversely to the measurement direction. This system provides important advantages if a correction system of great length is required due to large measuring lengths. This is because an arbitrarily large number of individual profile sections can be assembled to provide an arbitrarily long error correction system.

The error correction systems described above further include additional electrical or optical means for correcting the measuring result as a function of the correction profile, or else they are mechanically coupled to the measuring instrument. In all cases, however, they are not without problems of manufacture and assembly and they can be expensive and costly to construct.

SUMMARY OF THE INVENTION

The present invention is directed to an error correction system that is low in space requirements, that provides a large correction range, and that permits nonlinear corrections to be made. All of these advantages are provided in a system which provides a negligibly small inherent error and which is especially simple in construction, simple to produce, and simple to mount.

According to this invention, an error correction system for measuring instruments of the type described above is provided with a correction profile element which is formed in one piece and which provides a plurality of deflectable regions of reduced cross sectional area interposed between a plurality of rigid segments. Means are provided for mounting the correction profile element adjacent the scale such that the correction profile element extends generally along the measuring direction. The mounting means includes means for adjusting the contour of the correction profile element such that the correction profile element bends at at least a portion of the plurality of deflectable regions, substantially without bending at the plurality of rigid segments.

A particularly preferred embodiment of this invention utilizes a one piece correction profile element of the type described above mounted inside a housing which surrounds the measuring scale. The contour of this correction profile element is adjustable by means of eccentrics from the exterior of the housing such that the contour of the correction profile element can be made to correspond to the measured error to be corrected. Substantially standardized, economical components can be used for mounting the profile element in position and adjusting its contour. The present invention provides important advantages in terms of simplicity of design, manufacture, and use.

The invention itself, together with further objects and attendant advantages, will be best be understood by reference to the following detailed description taken in conjunction with the accompanying drawings.

BRIEF DESCRIPTION OF THE DRAWINGS

FIG. 1 is a cross sectional view of an encapsulated length measuring instrument which incorporates a first preferred embodiment of the present invention.

FIG. 2 is a partial cross sectional view taken along line 2—2 of FIG. 1.

FIG. 3 is an elevational view of a portion of the one piece correction profile element of the embodiment of FIGS. 1 and 2.

FIG. 4b is a top view of the correction profile element of FIG. 4a.

DETAILED DESCRIPTION OF THE PRESENTLY PREFERRED EMBODIMENTS

Figure 4A:
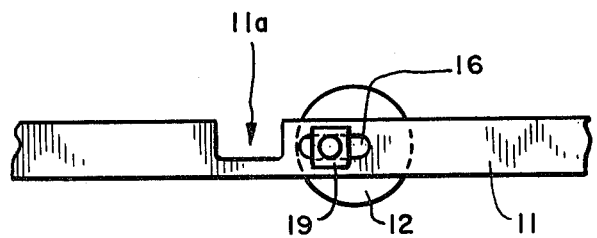
FIG. 4a is a partial view of a second preferred embodiment of the one piece correction profile element of this invention.

Turning now to the drawings, FIG. 1 shows a simplified cross sectional view of an encapsulated length measuring instrument which includes a housing 1 which is mounted on a bed 2 of a processing or measuring machine. Any suitable mounting means can be used to provide a solid, rigid coupling between the bed 2 and the housing 1. A slide piece 3 of the processing or measuring machine carries a mounting foot 4 which is fastened to the slide piece 3, for example by means of screws 5. The mounting foot 4 defines a sword shaped coupling member 6 which extends through a slit 1a formed in the otherwise completely enclosed housing 1. A measuring scale 8 is held in place on an inner surface of the housing 1 by means of an elastic adhesive layer 7. This scale 8 defines a measuring standard, such as a grid scale, for example. A scanning unit 9 is mounted within the housing 1 so as to be guided along the scale 8. The scanning unit 9 includes means, not represented in FIG. 1, for scanning the grid scale of the scale 8. Such means are well known to those skilled in the art and do not per se form part of this invention. Relative movement of the slide piece 3 with respect to the machine bed 2 is transferred via the mounting foot 4 and the coupling member 6 by means of an angle lever 10 to the scanning unit 9. By means of this mechanical coupling, relative movement between the slide piece 3 and the bed 2 results in relative movement between the scanning unit 9 and the scale 8.

Guidance errors of the machine bed 2 and the machine slide piece 3 would likewise be transferred to the scanning unit 9 and result in measurement errors, unless such guidance errors were corrected. For this reason, the length measuring device of FIGS. 1 and 2 includes a correction system which is mounted inside the housing 1. In this preferred embodiment, the correction system includes a one piece correction profile element 11 which is provided with an angular cross section as shown in FIG. 1. As best shown in FIGS. 2 and 3, this correction profile element 11 presents at intervals a plurality of regions 11a of reduced cross sectional area, where a major portion of the cross sectional area of the correction profile element 11 has been removed. Adjacent the regions of reduced cross sectional area 11a, adjusting means such as eccentrics 12 are provided to mount the error correction profile element 11 to the housing 1. Eccentrics 12 are used to deflect the correction profile elements from a straight line such that the contour of the correction profile element corresponds to the error to be compensated.

The angle lever 10 is mounted to the scanning unit 9 such that the angle lever 10 pivots about an axis 10'. A roller 13 is mounted to a free end of the angle lever 10 such that the roller 13 travels along and follows the lowermost surface of the correction profile element 11 and causes the angle lever 10 to pivot about the axis 10'. Thus, the angular position of the angle lever 10 about the axis 10' corresponds to the error correction to be made. This error correction is carried out by a second arm of the angle lever 10, which in this embodiment is also constructed as an eccentric 14. This eccentric 14 converts the pivotal movement of the angle lever 10 into a relative movement between the scanning unit 9 and the coupling member 6. The coupling member 6 which extends through the slit 1a of the housing 1 is sealingly enclosed by sealing lips 15 which are arranged in a downwardly projecting apex as shown in FIG. 1. The sealing lips 15 cooperate with the housing 1 to ensure secure encapsulation of the measuring system.

FIG. 2 shows only a portion of the embodiment of FIG. 1 in side view, in order better to illustrate the operation of this embodiment. The mounting foot 4 with the bores 4' for the fasteners 5 carries the coupling member 6, the upper side of which is provided with a cylindrical pin 6', on which the eccentric 14 of the angle lever 10 bears. Only a portion of the scanning unit 9 is shown in FIG. 2 to clarify the manner in which the angle lever 10 is mounted by means of the axis 10' which extends from the scanning unit 9. When the mounting foot 4 is moved in the direction shown by the arrow, the scanning unit 9 follows this longitudinal movement, since the scanning unit 9 is held by means of a spring 9' to the pin 6'. This longitudinal movement of the scanning unit 9 causes the roller 13 to move along the correction profile element 11. The contour of the correction profile element 11 is preferably adjusted by means of the eccentrics 12 to correspond to the desired error correction. As the roller 13 scans the correction profile element 11, the angle lever 10 is caused to swing about the axis 10' such that the eccentrics 12 adjust the separation between the scanning unit 9 and the cylindrical pin 6'. In this way, the relative separation along the measuring direction between the scanning unit 9 and the measuring foot 4 is adjusted by the correction profile element 11. Guidance errors to which the mounting foot 4 and the slide piece 3 are subject can be compensated for by a relative movement, caused by the adjustable error correction profile element 11, between the scanning unit 9 and the mounting foot 4.

FIG. 3 is a somewhat schematic view of the error correction profile element 11 deflected by the eccentrics 12. FIG. 3 clearly shows the manner in which the correction profile element 11 is made up of a plurality of straight, rigid segments separated by a plurality of reduced cross sectional regions 11a. When the eccentrics 12 are adjusted to cause the profile element to depart from a straight line, the contour of the correction profile element is made up of a plurality of rectilinear sections at the straight segments separated by a plurality of bending portions 11b at the reduced cross sectional regions 11a. Since changes in the contour of the profile element 11 result in changes in its effective length in the measuring direction, the profile 11 is mounted to the eccentrics 12 by means of oblong holes 16, which make possible longitudinal shifts of the entire correction profile element 11. Preferably, the correction profile element 11 is fixed at one end with respect to the zero point for the measurement in a known manner which is not shown.

Figure 4B:
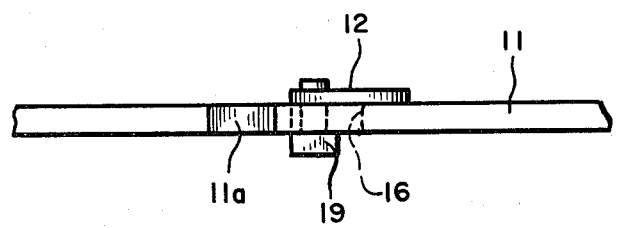
Figure 5:
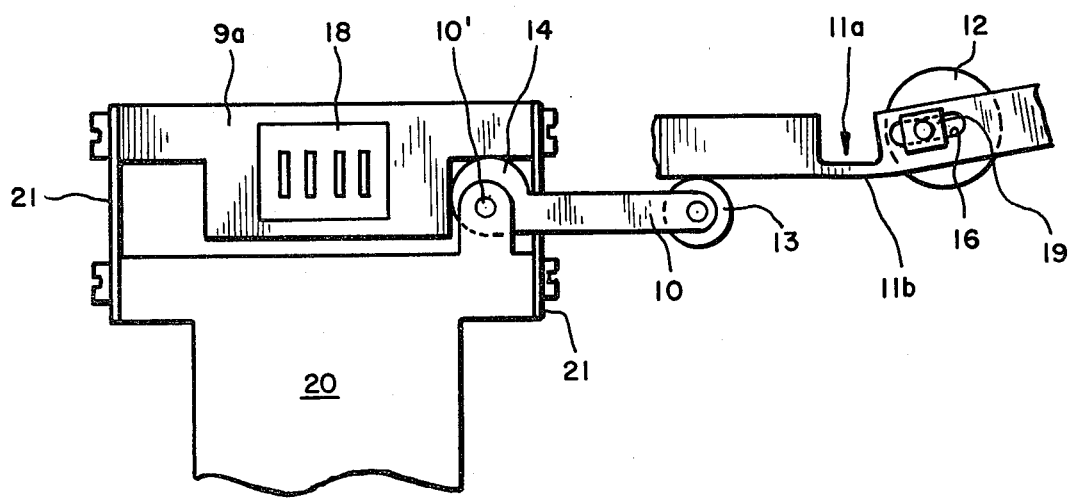
FIG. 5 is a side view of the correction profile element of FIGS. 4a and 4b in use in conjunction with means for correcting the position of a scanning plate.

FIGS. 4a, 4b and 5 disclose a second preferred embodiment of the correction profile element 11 of this invention which is made up of substantially flat straps which do not provide the angular cross sectional shape of the embodiment of FIGS. 1 through 3.

FIG. 5 shows a scanning plate 9a which is provided with a division 18. This embodiment is adapted for use with photoelectric digital length measuring scanning units, as is the embodiment of FIG. 1. In the simpler embodiment of FIG. 5, the scanning unit 9 is not guided along the scale 8 by separate guide means, but is instead connected directly by means of a coupling member 20 to one of the above-mentioned objects 3,2. The scanning plate 9a is connected by means of leaf springs 21 to the coupling member 20 in such a way that the scanning plate 9a can be moved along the measuring direction by means of a transfer element 10,13,14.

Once the contour of the correction profile element 11 has been adjusted to correspond to the error to be corrected, the correction profile element 11 is fixed in place on the housing 1 by means of clamping elements 19. Commercially available standard nuts are particularly well suited for use as the clamping elements 19 in the embodiment of FIGS. 1-3 since the angular cross sectional profile element 11 of FIGS. 1 through 3 provides a shank of the profile element 11 which serves to prevent the clamping elements 19 from rotating. In the alternate embodiment of FIGS. 4a, 4b, and 5, so called sliding blocks ("Kulissensteinen") which include a clamping flange can be used for the clamping elements 19.

Of course, it should be understood that the present invention is not restricted to use with photoelectric digital length measuring devices. To the contrary, this invention is well adapted for use in optical, inductive, capacitive, and magnetic measuring devices. The invention is also not restricted to the correction of guidance errors, but can also be used to correct measuring errors resulting from irregularties on the grid scale of the measuring scale. It is therefore intended that the foregoing detailed description be regarded as illustrative rather than limiting, and that it be understood that it is the following claims, including all equivalents, which are intended to define the scope of this invention.

I claim:

1. In an encapsulated length measuring instrument for measuring the relative position of two objects, said instrument comprising a scale extending along a measuring direction and a scanning unit guided to move along the scale to generate a measuring signal, the improvement comprising:
   a one piece correction profile element which defines a plurality of deflectable regions of reduced cross sectional area interposed between a plurality of rigid segments;
   means for mounting the correction profile element adjacent the scale such that the correction profile element extends generally along the measuring direction;
   means, included in the mounting means, for adjusting the contour of the correction profile element such that the correction profile element bends at at least a portion of the plurality of deflectable regions substantially without bending at the plurality of rigid segments; and
   means for correcting the measuring signal by an amount which varies as a function of the contour of the correction profile element.

2. The invention of claim 1 wherein the cross sectional shape fo the rigid segments is angular.

3. The invention of claim 1 or 2 wherein the plurality of regions of reduced cross sectional area are arranged at predetermined positions along the length of the correction file element, independently contour of the correction profile element maintained by the adjusting means.

4. The invention of claim 1 wherein each of the plurality of rigid segments defines a respective rectilinear correction surface.

5. In an encapsulated length measuring instrument for measuring the relative position of two objects, said instrument comprising a scale extending along a measuring direction and a scanning unit guided to move along the scale to generate a measuring signal, the improvement comprising:
   a one piece correction profile element which defines a plurality of deflectable regions interposed between a plurality of straight segments in alternating sequence, the cross sectional areas of the deflectable regions being less than the cross sectional areas of the straight segments, the straight segments being substantially rigid;
   means for mounting each of the straight segments in position adjacent the scale such that the correction profile element extends generally along the measuring direction and the position of each of the straight elements transverse to the measuring direction is adjustable, said mounting means effective to dispose the correction profile element in an adjustable contour comprising rectilinear portions at the straight segments and bending portions at the deflectable regions; and
   means for scanning the correction profile element and for adjusting the position of at least a portion of the scanning unit with respect to the scale in response to the contour of the correction profile element.

* * * * *